W. H. COLDWELL.
TRACTION AND ROLLING APPARATUS.
APPLICATION FILED FEB. 14, 1911.
1,085,379.
Patented Jan. 27, 1914.
4 SHEETS—SHEET 1.
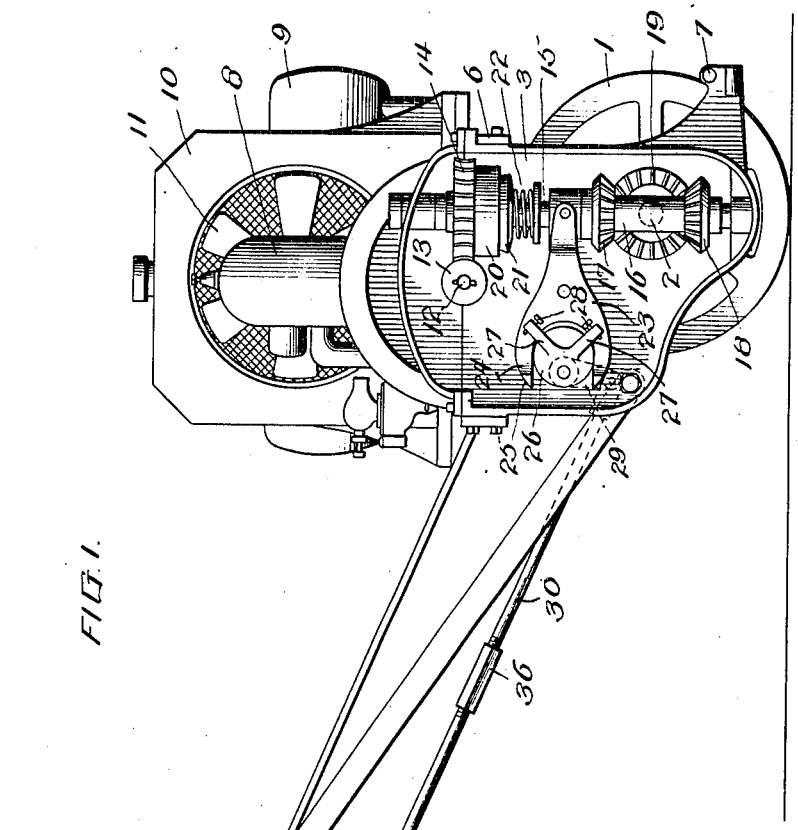
FIG. 1.
WITNESSES
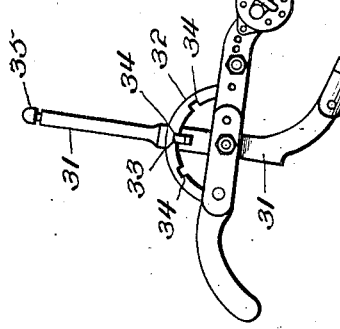
INVENTOR
William H. Coldwell
BY
Attorneys

W. H. COLDWELL.
TRACTION AND ROLLING APPARATUS.
APPLICATION FILED FEB. 14, 1911.

1,085,379.

Patented Jan. 27, 1914.

4 SHEETS—SHEET 4.

WITNESSES:

INVENTOR
William H. Coldwell
By
Attorneys

UNITED STATES PATENT OFFICE.

WILLIAM H. COLDWELL, OF NEWBURGH, NEW YORK.

TRACTION AND ROLLING APPARATUS.

1,085,379.  Specification of Letters Patent.  Patented Jan. 27, 1914.

Application filed February 14, 1911. Serial No. 608,548.

*To all whom it may concern:*

Be it known that I, WILLIAM H. COLDWELL, citizen of the United States, residing at Newburgh, in the county of Orange and State of New York, have invented certain new and useful Improvements in Traction and Rolling Apparatus; and I do hereby declare the following to be a full, clear, and exact description of the invention, such as will enable others skilled in the art to which it appertains to make and use the same.

My invention consists in the novel features hereinafter described reference being had to the accompanying drawings which illustrate one embodiment of the invention which I have selected for purposes of illustration and the invention is fully disclosed in the following description and claims.

Figure 2:
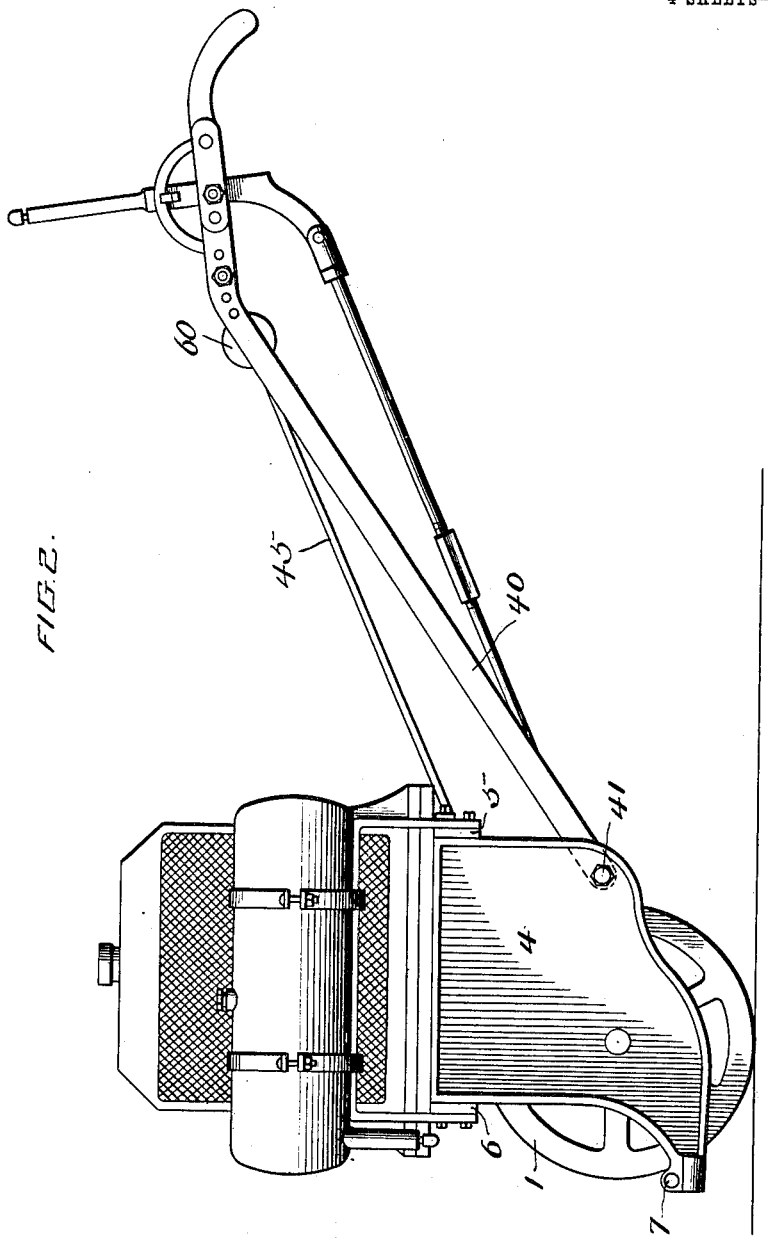
Figure 3:
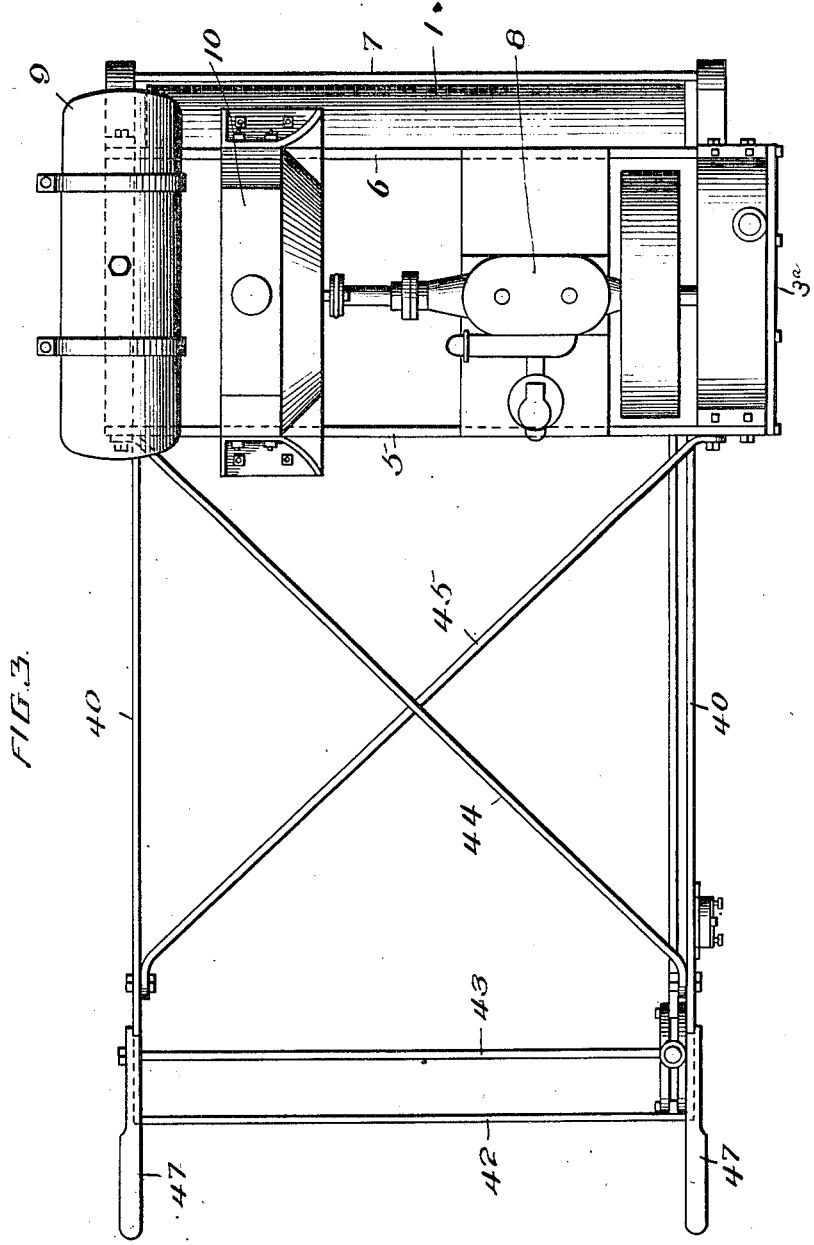
Figure 4:
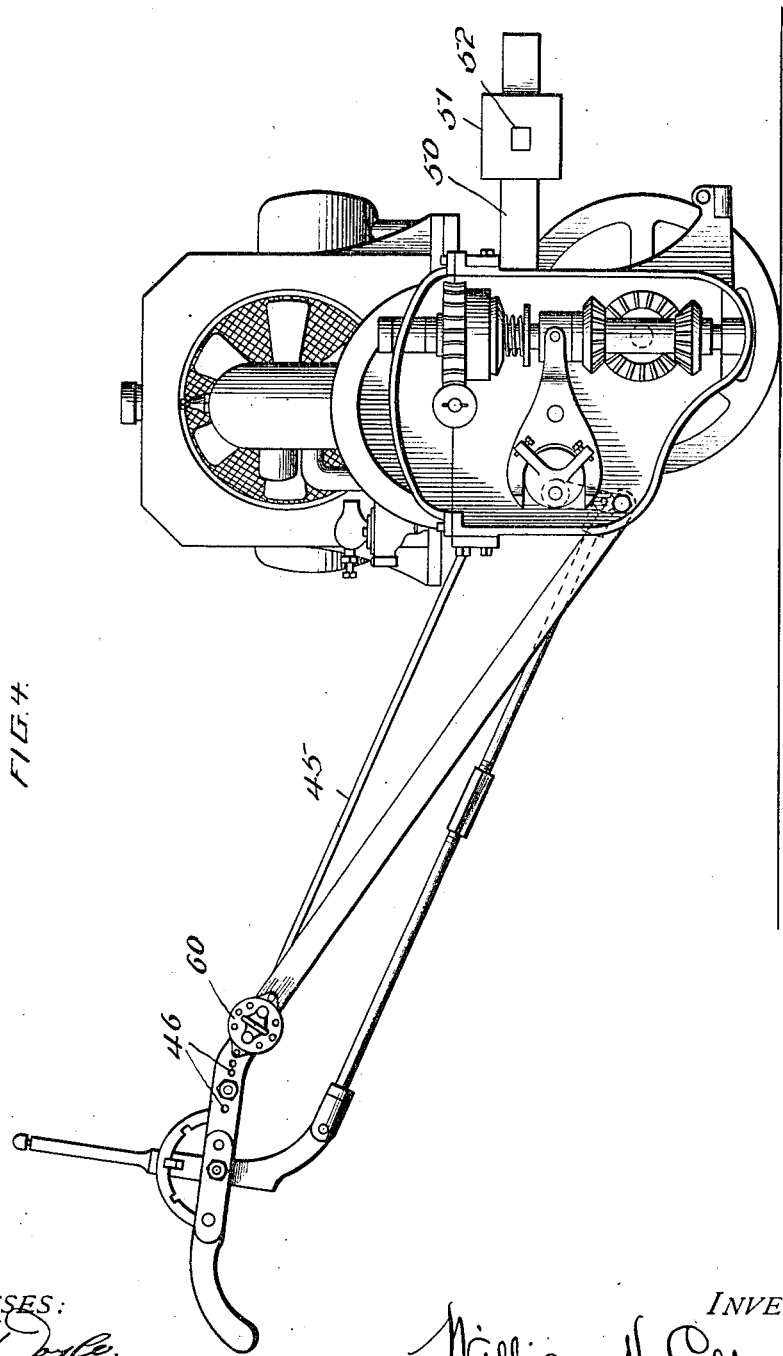

Referring to the said drawings, Figure 1 represents a right side elevation of an apparatus embodying my invention, the cover plate for the gear casing being removed to show the parts within the same. Fig. 2 is a left side view of the apparatus. Fig. 3 is a top plan. Fig. 4 is a view similar to Fig. 1 showing the main frame provided with a counterbalance weight to resist the torque or thrust of the driving gearing.

The object of my invention is to provide an extremely cheap and simple power operated traction device which can be employed as a roller for lawns, tennis courts and other surfaces, and which can also be employed for traction purposes for example, to propel over the ground a lawn mower, lawn sweeper, tennis court marker or other device, or for transporting slow moving wagons, vehicles or agricultural machinery, much as a draft animal or animals are employed, and which may be used to exert either a pushing or pulling force according to the circumstances of use. In devices of this general character only a very moderate speed is either desired or attained, not exceeding the speed of an average man walking, and I therefore provide the apparatus with suitable handles to be grasped by an operator, to enable him to guide the device when in operation and also to maintain it in operative position. I am thus enabled to dispense with all ground engaging devices except the traction wheels or rollers and also with steering mechanism, thus greatly simplifying the apparatus and cheapening the cost of manufacture.

In the embodiment of my invention which I have selected for purposes of illustration, 1 represents a combined traction and lawn rolling roller, which may consist of a single roller but which preferably comprises two roller sections, although I do not limit myself to any particular number of sections. The roller is (or roller sections are) mounted upon a main driving shaft or axle 2, indicated in dotted lines in Fig. 1 and where two roller sections are employed, I prefer to employ any well known means for permitting one of the roller sections to turn faster than the other, such as pawl and ratchet mechanism connecting the roller sections independently with the shaft, or the well known differential gearing. The use of these devices is so well known that I have not illustrated them herein.

Upon the driving shaft or axle 2, is mounted a main frame which comprises in this instance two side plates 3 and 4, connected by suitable brace rods as 5, 6 and 7. The side plates 3 and 4 are provided with bearings to engage the axle 2, and upon the main frame is mounted in any desired manner, any suitable form of motor. In the present instance I have shown an internal combustion engine 8 mounted on the main frame together with a gasolene tank 9, and a radiator 10 operatively connected with the water jacket of the engine cylinder or cylinders, and provided with a fan 11. The particular form of the motor is not of the essence of the invention and its construction need not therefore be particularly described.

The motor 8 is connected with the traction rollers by suitable gearing for turning the rollers in either a forward or backward direction. In this instance I have shown an engine shaft 12 provided with a worm 13 engaging a worm wheel 14 mounted on a vertical shaft 15, mounted in bearings in a box or casing carried by the side plate 3. The said shaft 15 is provided with a sleeve 16 movable longitudinally of the shaft but connected therewith by a key or spline so as to rotate therewith, and said sleeve is provided with oppositely disposed bevel pinions 17 and 18 for engaging a bevel gear 19 on the shaft or axle 2, for driving the roller 1. In order to avoid injury to the mechanism I prefer to provide a frictional device at some point between the engine shaft and the roller which will allow a slight slipping when the engine is thrown into connection with the roller, if necessary to relieve the gearing from shock. To this end I advantageously mount the worm wheel 14 loosely on the shaft 15 and provide it with a friction clutch member 20, and I provide the shaft 15 with a co-acting friction clutch member 21, connected for rotation with the shaft but movable longitudinally thereof, as by means of a key or spline, the friction clutch members being normally held in operative relation by a spring 22.

The bevel pinions 17 and 18 are located such a distance apart that the sleeve 16 may be moved to a median position in which neither of the pinions engage the bevel gear 19. I provide means for holding the sleeve in such median position and also for throwing one or other of the said bevel pinions into engagement with the gear wheel 19. In this instance I have shown a shipping lever 23, pivotally mounted in the gear case and provided at one end with a yoke operatively connected with the sleeve 16, and having the other end bifurcated to embrace a cam or eccentric 26 rotatably mounted on a short shaft, within the gear case, and provided with angularly disposed stop arms 27, 27 each of which carries an adjusting screw 28 adapted to engage a stop 25 on one of the arms or bifurcations 24 of the shifting lever to arrest the movement thereof adjustably in both directions so as to secure the proper intermeshing of the pinions 17 and 18 with gear wheel 19 and prevent grinding or undue wearing of the gears.

The cam or eccentric 26 is operated by means of an arm 29 secured to its pivotal shaft and connected by an adjustable link 30 with a hand lever 31, pivotally mounted on the handle structure hereinafter described, adjacent to a segment 32, a suitable spring pawl 33 being provided in connection with said handle, for engaging locking notches 34 in the segment, and connected with a push rod 35 extending through a hollow part of the handle 31 in a well known way for disengaging said pawl from said notches. By means of the handle 31 and segment and pawl just described the shifting lever may be operated to hold the sleeve 16 in median or neutral position or to hold either of the pinions 17 and 18 in mesh with the gear wheel 19. The casing inclosing the gearing is conveniently formed by providing the side frame 3 with marginal flanges, and I prefer to provide a cover plate or closure (3ª Fig. 3) fitted to said flanges and secured to the side plate by suitable bolts or screws, and to fill the said casing with grease or oil in which the moving parts of the gearing run at all times to insure proper lubrication thereof. I also provide the main frame with a suitable handle or handles to enable the operator, who follows the apparatus when it is in use, to guide the roller and turn it in any direction, and also for enabling the operator to maintain the apparatus in proper perpendicular relation with the ground traversed. The weight of the main frame of the motor and connected parts carried by the main frame is so disposed that it is borne entirely by the roller, and practically balanced with respect thereto. I also find that when the apparatus is in operation the torque of the engine in driving the roller reacts somewhat upon the main frame tending to move it around the axle in one direction or the other according to the direction in which the apparatus is propelled. The torque is a varying resistance which is thrown back upon the operator, but in practice it can be practically compensated for by slightly raising or lowering the handles and thus slightly altering the position of the center of gravity of the main frame and its supported parts with respect to the axis of the roller. In order to relieve the operator as much as possible from the necessity of exerting any material force in a vertical direction I make the handle or handles of considerable length and also provide for the adjustment of the hand engaging portions thereof to accommodate operators of varying heights, in order that the operator may at all times occupy a comfortable position in holding and guiding the device. In some instances, as hereinafter described, I provide the main frame with counter balancing means to more perfectly distribute the weight with respect to the axis of the roller.

In the embodiment of the invention herein shown, the main frame is provided with two handle bars 40, 40 pivotally connected to the side frames 3 and 4 at 41, 41 and connected at their outer extremities by cross bars 42, 43. The handle bars 40 are also braced and secured in the desired position by diagonal brace bars 44, 45 which are bolted to the cross bar 5 of the main frame above the pivotal connections 41 of the handle bars, and are also bolted at their rear ends to the handle bars, a plurality of apertures 46 being provided in each handle bar for example, (as herein shown) to provide for an adjustment of the handle bars with respect to the main frame. The handle bars are provided at their outer extremities with hand engaging portions 47, 47. When the desired adjustment of the handle bars is secured in the manner indicated (or in any other desired way) the link 30 is adjusted correspondingly, in this instance by means of the reversely threaded sleeve 36, engaging reversely threaded ends of separate parts of said link as shown herein.

In Fig. 4 I have shown the side frames 3 and 4 provided with a forwardly projecting arm (or arms) 50, provided each with a counter balance weight 51 adjustable thereon toward and from the main frame and adapted to be secured in adjusted position by a set screw 52 for assisting in securing the desired adjustment of the apparatus and relieve the operator from exertion in guiding and operating the machine. I may employ one or more of these weights as found convenient or desirable and they will add to the effective weight of the device as a roller. For convenience I also prefer to locate on the handle structure within reach of the operator the means for controlling the speed of and for stopping the motor. Thus in the drawings I have shown at 60 the switch for controlling the igniter to start and stop the engine and to advance or retard the instant of sparking, said switch being located on one of the handle bars conveniently near the hand lever 31, for controlling the gearing.

It will be seen that the apparatus herein shown and described constitutes a very simple and cheap power roller for land and lawn rolling purposes, which is convenient to operate and can be guided in use and transported from place to place under its own power, the operator merely steadying the apparatus by means of the handles to secure the proper equilibrium of the same at all times, and to steer it. The device can also be made use of to propel certain other machines as previously stated which can be secured to the device in any desired manner. For example the propelled devices can be secured in rear of the operator by links or other connections from the main frame, or may be connected by links or braces to the front brace bars 6 or 7, or to other portions of the main frame and pushed ahead of the roller. It will also be seen that the device may be moved to any desired point where power is desired and the main frame supported in any suitable manner, so that the power of the motor can be utilized, as for pumping water, sawing wood or running machinery, by means of a belt from the driving wheel of the engine, or otherwise, the gearing for driving the roller being moved to the neutral position to facilitate such use of the motor.

What I claim and desire to secure by Letters Patent is:—

1. A traction and rolling apparatus consisting of a traction and lawn rolling roller, a motor carried thereby substantially balanced over the axis of rotation of the roller, when in operative position and operatively connected with the roller for driving the same, said roller forming the sole ground engaging support for the motor when the apparatus is in operation and a hand engaging part freely movable while the apparatus is in operation without interfering with the operation thereof, adapted to be grasped by an operator walking with the apparatus, and operatively connected with the roller for steering the same.

2. A traction and rolling apparatus, consisting of a traction and lawn rolling roller, a motor carrying frame carried thereby, a motor carried by said frame and substantially balanced over the axis of rotation of said roller, and operatively connected with said roller for driving the same, said roller forming the sole ground engaging support for the motor frame and motor, when the apparatus is in operation, and a hand engaging part adapted to be grasped by an operator walking with the apparatus, and movable freely both vertically and horizontally, said hand engaging part being connected with the roller for guiding the same, and with the motor carrying frame for adjusting the weight of the same with respect to the axis of rotation of the roller to maintain it and the motor in a state of substantial equilibrium over the axis of the roller.

3. A traction and rolling apparatus, consisting of a motor carrying frame, a traction and lawn rolling roller, mounted therein and forming the sole ground engaging rotary support for said frame when the apparatus is in operation, and having its ground engaging portions extending in a line transversely of the path of travel of the apparatus, a motor carried by said frame, and operatively connected with said roller for driving the same and a hand engaging part adapted to be grasped by an operator walking with the apparatus, said part being rigidly secured to the said frame and movable freely both vertically and horizontally, by hand while the apparatus is in operation and without interfering with the operation thereof, for steering the apparatus, and maintaining the said frame and motor substantially balanced over the axis of rotation of said roller.

4. In a traction and rolling apparatus, the combination with a motor carrying frame, of a traction lawn rolling roller connected therewith and having its ground engaging portions disposed in a single line extending transversely of the line of travel of the apparatus, said traction roller forming the sole support for said frame and a hand engaging part rigidly secured to said frame, for steering said roller and adjusting the frame, with respect to the axis of the roller to enable the roller to support substantially the entire weight of the frame at all times, a motor mounted on said frame, and operative connections between the roller and motor, and a counter balancing device secured to said frame.

5. In a traction and rolling apparatus, the combination with a motor carrying frame, of a traction lawn rolling roller connected therewith and having its ground engaging portions disposed in a single line extending transversely of the line of travel of the apparatus, said traction roller forming the sole support for said frame and a hand engaging part rigidly secured to said frame, for steering said roller and adjusting the same, with respect to the axis of the roller to enable the roller to support substantially the entire weight of the frame at all times, a motor mounted on said frame, and operative connections between the roller and motor, a counter balance weight secured to said frame, and means for adjusting said weight at different positions with respect to the axis of said traction roller.

6. In a traction and rolling apparatus, the combination with a motor carrying frame, of a traction lawn rolling roller connected therewith and having its ground engaging portions disposed in a single line extending transversely of the line of travel of the apparatus, said traction roller forming the sole support for said frame, and a hand engaging part rigidly secured to said frame, for steering said roller and adjusting the frame with respect to the axis of the roller to enable the roller to support substantially the entire weight of the frame at all times, a motor mounted on said frame and operative connections between said roller and motor, and means for permitting the adjustment of the position of the hand engaging device with respect to the motor frame.

7. In a traction and rolling apparatus, the combination with a motor carrying frame, of a traction roller connected therewith and having its ground engaging portions disposed in a single line extending transversely of the line of travel of the apparatus, said traction roller forming the sole support for said frame, and a hand engaging part rigidly secured to said frame, for steering said roller and adjusting the frame, with respect to the axis of the roller to enable the roller to support substantially the entire weight of the frame at all times, a motor mounted on said frame, and operative connections between the roller and motor, means for permitting the adjustment of the hand engaging device with respect to the motor frame, an operating hand lever carried by said hand engaging device, controlling connections from said hand lever to the driving connections between the motor and roller, and means for adjusting said controlling connections to accommodate variations in the position of the said hand engaging device.

8. In a traction and rolling apparatus, the combination with a traction lawn rolling roller, having its ground engaging portions in a single line disposed transversely of the travel of the apparatus, of a motor frame pivotally supported upon the axle of said traction roller, said traction roller forming the sole support for the said frame, a motor carried by said frame, reversible gearing for driving the said traction roller, worm gearing interposed between said reversible gearing and the motor, devices for throwing the driving gearing into and out of operation and a hand engaging part, rigidly connected with said frame and adapted to be grasped by an operator walking with the machine for steering the apparatus and for maintaining the frame at all times in substantial equilibrium above the axis of the traction roller.

9. In a traction apparatus and roller the combination with a ground engaging roller forming the only ground engaging device of the apparatus, of a motor carrying frame, a vertically disposed shaft carried by said frame and provided with opposite beveled pinions, a bevel gear located between said pinions and connected with said roller, means for placing one or other of said pinions in operative relation with said shaft and gear wheel, for driving the roller, a motor on said frame provided with a horizontal driving shaft, worm gearing for connecting the motor shaft with said vertical shaft, a friction device interposed between said worm gearing and the said vertical shaft and a handle connected rigidly to the main frame for steering the same and maintaining it in proper relation with the roller to enable the roller to support substantially the entire weight of the motor and frame.

10. In a traction apparatus and roller, the combination with a ground engaging roller forming the only ground engaging device of the apparatus, of a motor carrying frame, a vertically disposed shaft carried by said frame and provided with opposite beveled pinions, a bevel gear located between said pinions and connected with said roller, a shifting lever operatively connected to said pinions, and provided with a bifurcated part, each arm of said bifurcated part having a stop thereon, a rotary eccentric device engaging the bifurcated portion of said lever, and provided with stop arms, adjustable stops carried by said stop arms for engaging the stop on the arms of the bifurcated portion of said lever, means for operating said eccentric device, a motor mounted on the main frame, reducing gearing connecting said motor with said vertically disposed shaft, and a handle rigidly secured to said main frame, for steering the same and maintaining it in proper relation with the roller.

In testimony whereof I affix my signature, in the presence of two witnesses.

WILLIAM H. COLDWELL.

Witnesses:
J. K. MOORE,
R. E. BARRY.